United States Patent
Kokajko et al.

(10) Patent No.: US 12,493,445 B2
(45) Date of Patent: Dec. 9, 2025

(54) LISTENING ASSISTANCE BY VIRTUAL CONFERENCE APPLICATIONS FOR HYBRID EVENTS

(71) Applicant: Zoom Video Communications, Inc., San Jose, CA (US)

(72) Inventors: Samuel Kokajko, Round Rock, TX (US); Jonathan Kokotajlo, Brooklyn, NY (US)

(73) Assignee: Zoom Communications, Inc., San Jose, CA (US)

( * ) Notice: Subject to any disclaimer, the term of this patent is extended or adjusted under 35 U.S.C. 154(b) by 333 days.

(21) Appl. No.: 18/112,184

(22) Filed: Feb. 21, 2023

(65) Prior Publication Data
US 2024/0281197 A1    Aug. 22, 2024

(51) Int. Cl.
*G06F 3/16*    (2006.01)

(52) U.S. Cl.
CPC .................................... *G06F 3/165* (2013.01)

(58) Field of Classification Search
CPC ....................................................... G06F 3/165
See application file for complete search history.

(56) References Cited

U.S. PATENT DOCUMENTS

| | | | | |
|---|---|---|---|---|
| 10,650,840 | B1 * | 5/2020 | Solbach | G10L 21/0224 |
| 2013/0106976 | A1 * | 5/2013 | Chu | H04N 7/148 |
| | | | | 348/E7.083 |
| 2017/0041357 | A1 * | 2/2017 | Wang | H04L 65/403 |
| 2020/0396540 | A1 * | 12/2020 | Ehlert | H04L 65/80 |
| 2021/0058517 | A1 * | 2/2021 | Serbajlo | H04L 12/1827 |

FOREIGN PATENT DOCUMENTS

EP    3627860 A1 *  3/2020    ......... H04M 1/6058

* cited by examiner

*Primary Examiner* — Fan S Tsang
*Assistant Examiner* — Tyler Michael Liebgott
(74) *Attorney, Agent, or Firm* — Kilpatrick Townsend & Stockton LLP

(57) ABSTRACT

Example methods and systems provide listening assistance via a virtual conference application for hybrid events. A client device joins a virtual session of an on-site event via the virtual conference application provided by a virtual conference provider. The virtual conference application receives a first audio signal of the virtual session and a second audio signal directly from the audio source at the on-site event. The virtual conference application determines the second audio signal has a latency in reference to the first audio signal satisfying a threshold value. The virtual conference application delays the first audio signal to create a delayed first audio signal to substantially align in time with the second audio signal at the client device. The client device then transmits the delayed first audio signal to an assistive listening device.

20 Claims, 8 Drawing Sheets

LISTENING ASSISTANCE BY VIRTUAL CONFERENCE APPLICATIONS FOR HYBRID EVENTS

FIELD

The present application generally relates to virtual conferencing and more specifically relates to listening assistance by virtual conference applications for hybrid events.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
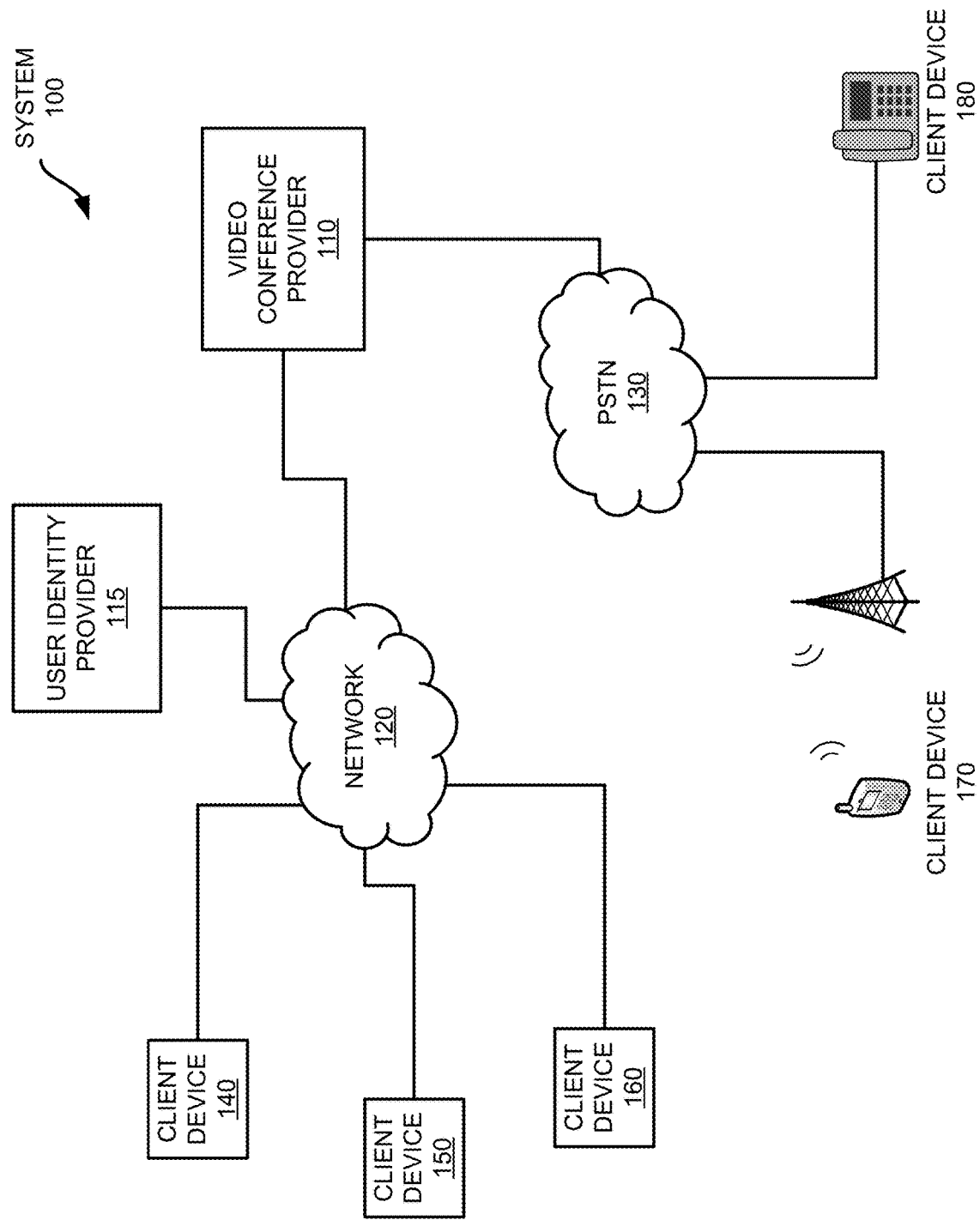
FIG. 1 shows an example system that provides videoconferencing functionality to various client devices.

Examples are described herein in the context of listening assistance by virtual conference applications for hybrid events. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

When events, such as a conference, an exposition, or a trade show, are held on site, the event host may provide virtual access in addition to on-site attendance. Such an event is called a hybrid event, including an on-site session and a corresponding virtual session. The corresponding virtual session can be established by a virtual conference provider via a virtual conference device on site. Virtual participants can join the virtual session via a virtual conference application installed on their personal devices to receive audio and video streaming. Virtual participants with impaired hearing can use their personal sound amplifier, such as a hearing aid or headphones, which can be connected to their personal devices for virtual conferences.

For on-site participants with impaired hearing, the event site may have assistive hearing systems installed. The traditional inductive loop systems for assistive listening are fixed in location and the range for access to assistive listening is short. Audio strength outside the looped area may not be strong enough to provide assistive audio to users with compatible devices and the fidelity level of the audio is likely to be low. Frequency-Modulated (FM) systems for assistive listening are an alternative but are prone to radio interference and interception. Further, both types of assistive listening system need significant hardware investment and installation.

To provide high-quality and versatile listening assistance for on-site participants, a virtual conference application can be installed on an on-site participant's personal device, such as a smart phone, tablet, or laptop computer. An on-site participant can join a corresponding virtual session for the on-site event via the virtual conference application, which includes an assistive listening component. The assistive listening component can provide dynamically time-aligned audio streams for the on-site participants, which can be transmitted to the on-site participant's assistive listening device.

For example, when an on-site participant at an on-site event launches a virtual conference application on a personal device to join a virtual session for the on-site event, the virtual conference application automatically determines that the virtual session corresponds to the on-site event and then switches from full virtual mode to companion mode. In companion mode, the video and audio streaming from the virtual session is automatically disabled since the on-site participant generally can hear and see what happens at the on-site event in person. However, the on-site participant can still access other features of the virtual session, such as chats, polls, closed captions, and interpretation, and assistive listening for hearing-impaired attendees.

When the on-site participant activates the assistive listening component either in full virtual mode or companion mode, the virtual conference application receives audio streams of the virtual session from the virtual conference provider. Meanwhile, the virtual conference application receives audio signals directly from the audio source at the on-site event via a microphone of the personal device. The virtual conference application can determine if the audio signals received via the microphone has a latency in reference to the audio streams from the virtual conference provider, which can be called relative latency thereafter.

In some examples, the virtual conference application determines the relative latency by determining the time difference of a particular audio signature appears in the two audio channels. The virtual conference application can detect a particular audio signature in the audio streams from the virtual conference provider at a first time point. The virtual conference application can then analyze the audio signals received via the microphone to detect the same particular audio signature at a second time point. The virtual conference application compares the second time point to the first time point to determine the relative latency.

In some examples, the virtual conference application determines the relative latency based on a distance between the personal device and the audio source at the on-site event. The virtual conference application can determine the distance based on location technologies, such as Global Positioning System ("GPS"), Wi-Fi, near-field communication ("NFC") and Bluetooth. Usually, there is approximately a 1-millisecond delay to receive the audio signal for every foot moving away from the audio source. With this information, the distance can be converted to an audio latency for the audio signals received via the microphone of the personal device in reference to the audio source. The latency of the audio streams from the virtual conference provider in reference to the audio source can vary due to different factors, such as the configuration of the internal network and the virtual conference provider. For example, if the virtual conference provider process audio streams in low latency mode, the audio streams usually arrive at the personal device with a 33-millisecond delay in reference to the audio source. The virtual conference application can request such latency information from the virtual conference provider and determines the relative latency by comparing the converted audio latency to the latency of the audio streams from the virtual conference provider in reference to the audio source.

If the relative latency is greater than a threshold value (e.g., 8 milliseconds), the virtual conference application delays the audio streams from the virtual conference provider to substantially align in time with the audio signals received via the microphone at the personal device. In some examples, a delay buffer is used to delay the audio streams from the virtual conference provider. The delayed audio streams from the virtual conference provider are then transmitted to an assistive listening device paired with the personal device. If the latency is not greater than the threshold value, the audio streams from the virtual conference provider are transmitted to the assistive listening device without delaying.

In some examples, the virtual conference provider processes the audio streams of the virtual session so that they substantially align in time at the personal device with the audio signals received from the audio source via the microphone of the personal device. The virtual conference application can transmit the location information of the personal device to the virtual conference provider. The virtual conference provider can obtain location information of the audio source at the on-site event from event information of the virtual session or from the virtual conference application installed on the personal device. The virtual conference provider then determines a distance between the personal device and the audio source at the on-site event and converts the distance to an audio latency value. The virtual conference provider then processes the audio streams of the virtual session based on the audio latency value so that the audio streams of the virtual session are substantially aligned in time at the personal device with the audio signals directly from the audio source at the on-site event.

The assistive listening device can be paired with the personal device via Bluetooth, Bluetooth Low Energy ("BLE"), ultra-wideband ("UWB"), or any suitable short-distance wireless communication protocol. The delayed or non-delayed audio streams from the virtual conference provider are transmitted from the personal device to the assistive listening device via the corresponding wireless communication protocol. Alternatively, the assistive listening device is physically connected to the personal device by a wire, and the delayed or non-delayed audio streams from the virtual conference provider are then transmitted from the personal device to the assistive listening device via wired transmission. The assistive listening device can adjust the strength level (e.g., volume) of the audio streams from the virtual conference application.

Thus, this example provides high-quality and versatile listening assistance for on-site participants with impaired hearing via a virtual conference application. The assistive listening component of the virtual conference application provides time-aligned audio for on-site hearing-impaired participants without additional hardware installation on site. In addition, it dynamically aligns the audio streams from the virtual conference provider to the location of the on-site participant as the on-site participant changes location. Meanwhile, on-site participants can adjust the volume of the audio streams via the personal device based on personal preference.

This illustrative example is given to introduce the reader to the general subject matter discussed herein and the disclosure is not limited to this example. The following sections describe various additional non-limiting examples and examples of listening assistance by companion applications for hybrid events.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
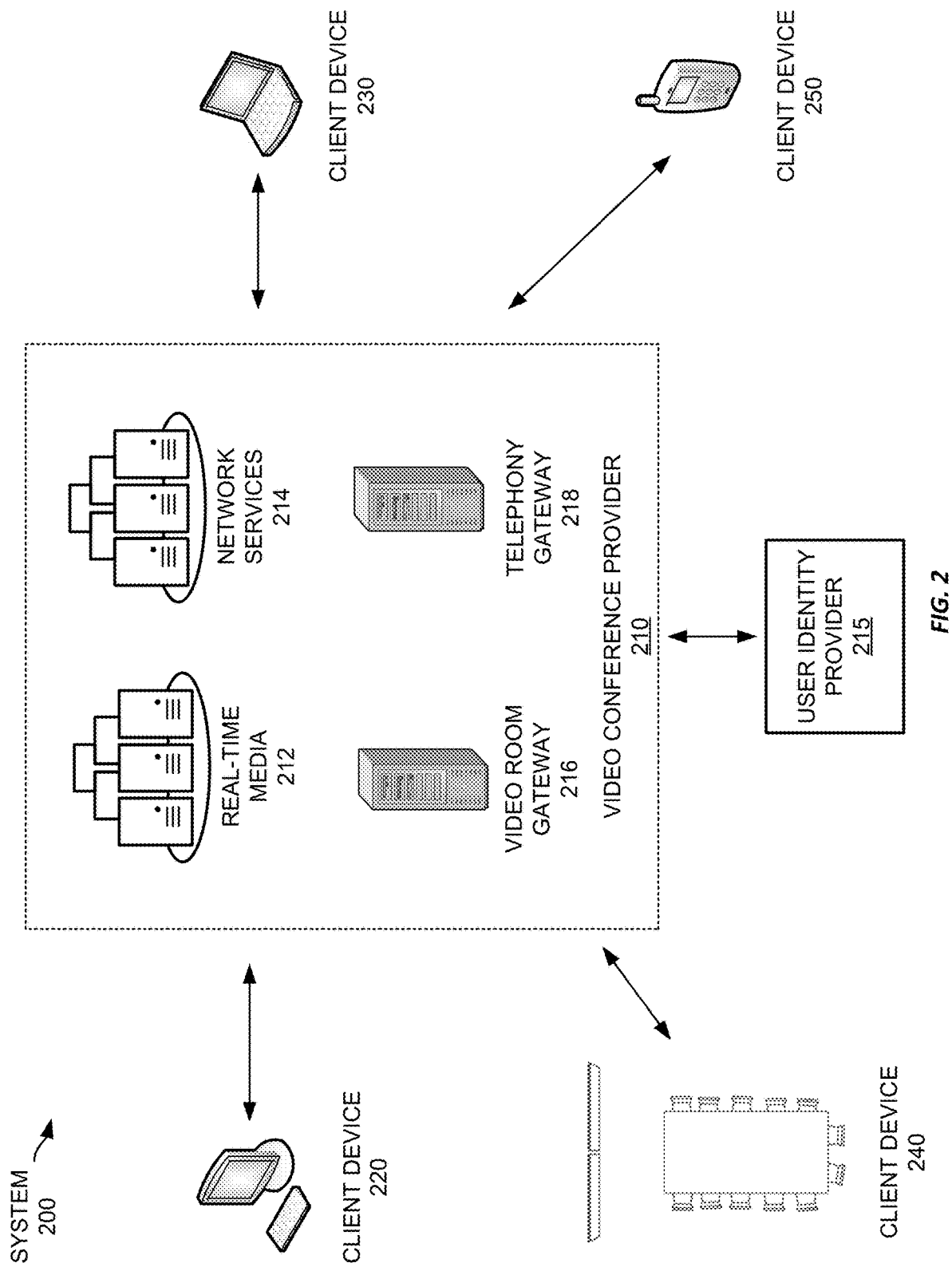
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these client devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the system of video conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials.

Once the user's credentials have been accepted, the client device 220-250 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
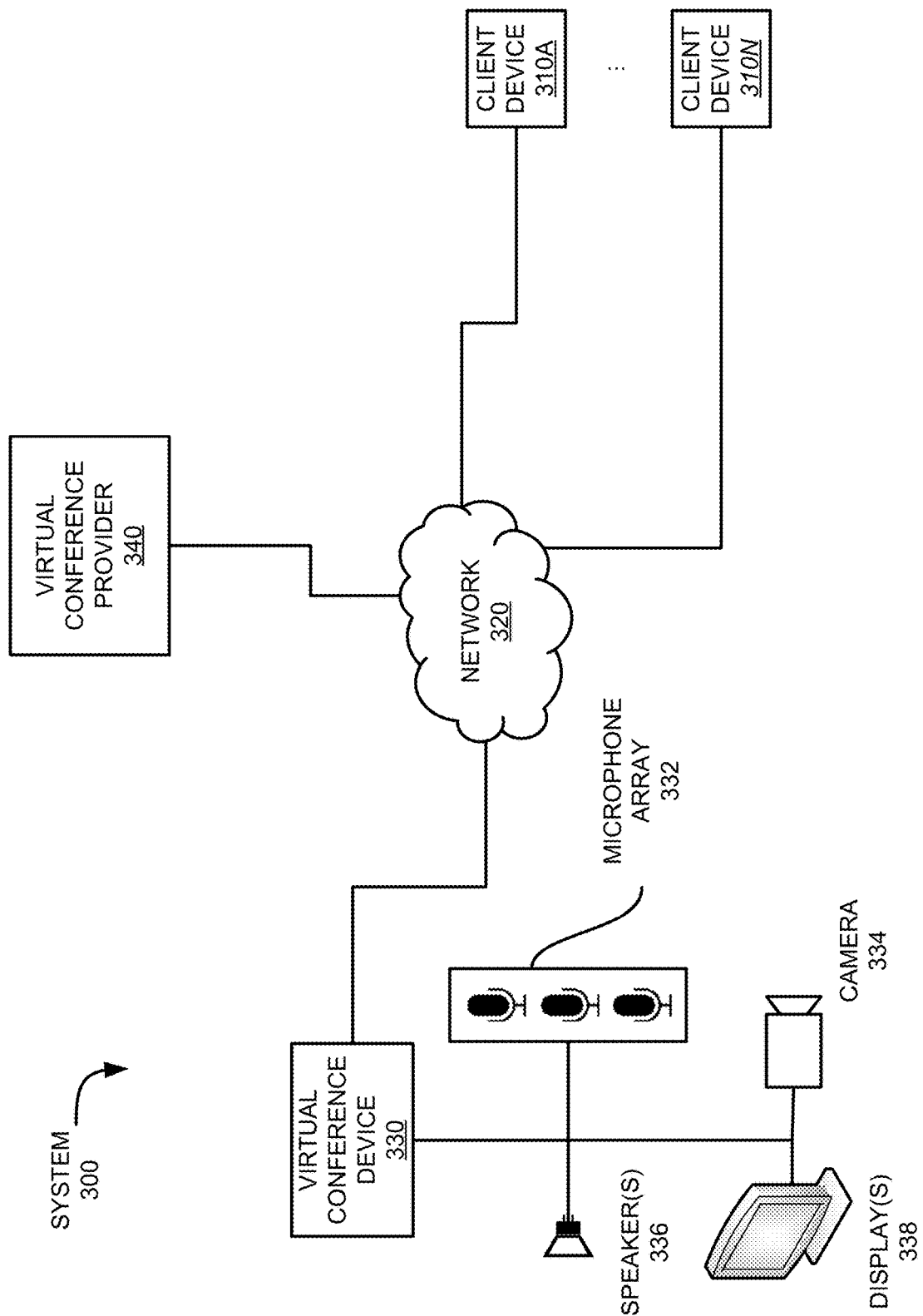
FIG. 3 shows an example system for creating a virtual session for a corresponding on-site event.

Referring now to FIG. 3, FIG. 3 shows an example system 300 for creating a virtual session for a corresponding on-site session. In this example system 300, a virtual conference device 330 and a number of client device 310A-310N (which may be referred to herein individually as a client device 310 or collectively as the client devices 310) are connected to a virtual conference provider 340 via a network 320. In this example, the network 320 is the internet, however, any suitable communications network or combination of communications network may be employed, including LANs (e.g., within a corporate private LAN) and WANs, similar to the network 110 illustrated in FIG. 1. The virtual conference provider 340 can be the video conference provider 110 illustrated in FIG. 1 or video conference provider 210 illustrated in FIG. 2. The client devices 310 can be client devices 140-160 illustrated in FIG. 1 or client devices 220-250 illustrated in FIG. 2.

In this example, virtual conference device 330 provides video conferencing functionality to an on-site event in a common area, such as a conference room. The virtual conference device 330 in this example includes a computing device, a microphone array 332, camera(s) 334, one or more speaker devices 336, and display(s) 338 installed within a conference room. While the virtual conference device 330 operates as a client device, its hardware components may be dispersed throughout the conference room to enable virtual participants to hear on-site participants and enable on-site participants to hear virtual participants.

The virtual conference device 330 has virtual conferencing software installed on it to enable it to connect to the virtual conference provider 340, to capture audio and video data using the microphone array 332 and camera(s) 334, and exchange audio and video streams with virtual participants via the virtual conference provider 340. While the virtual conference device 330 in some examples may include dedicated video conferencing equipment as discussed above, in other examples, it may be a conventional computing device, such as a desktop or laptop computer, or a handheld device such as a tablet or smartphone.

Similarly, each client device 310 executes a virtual conference application, which connects to the virtual conference provider 340, to join the virtual session hosted by the virtual conference device 330. During the virtual session, the various virtual participants, via their respective client devices, are able to interact with each other and on-site participants by viewing video streams and hearing audio streams from other participants, and by capturing and transmitting video and audio of themselves. On-site participants may also join the virtual session via their respective client devices. The virtual conference application may automatically switch to companion mode in which the video and audio streams are deactivated but other features are still available for on-site participants.

Figure 4:
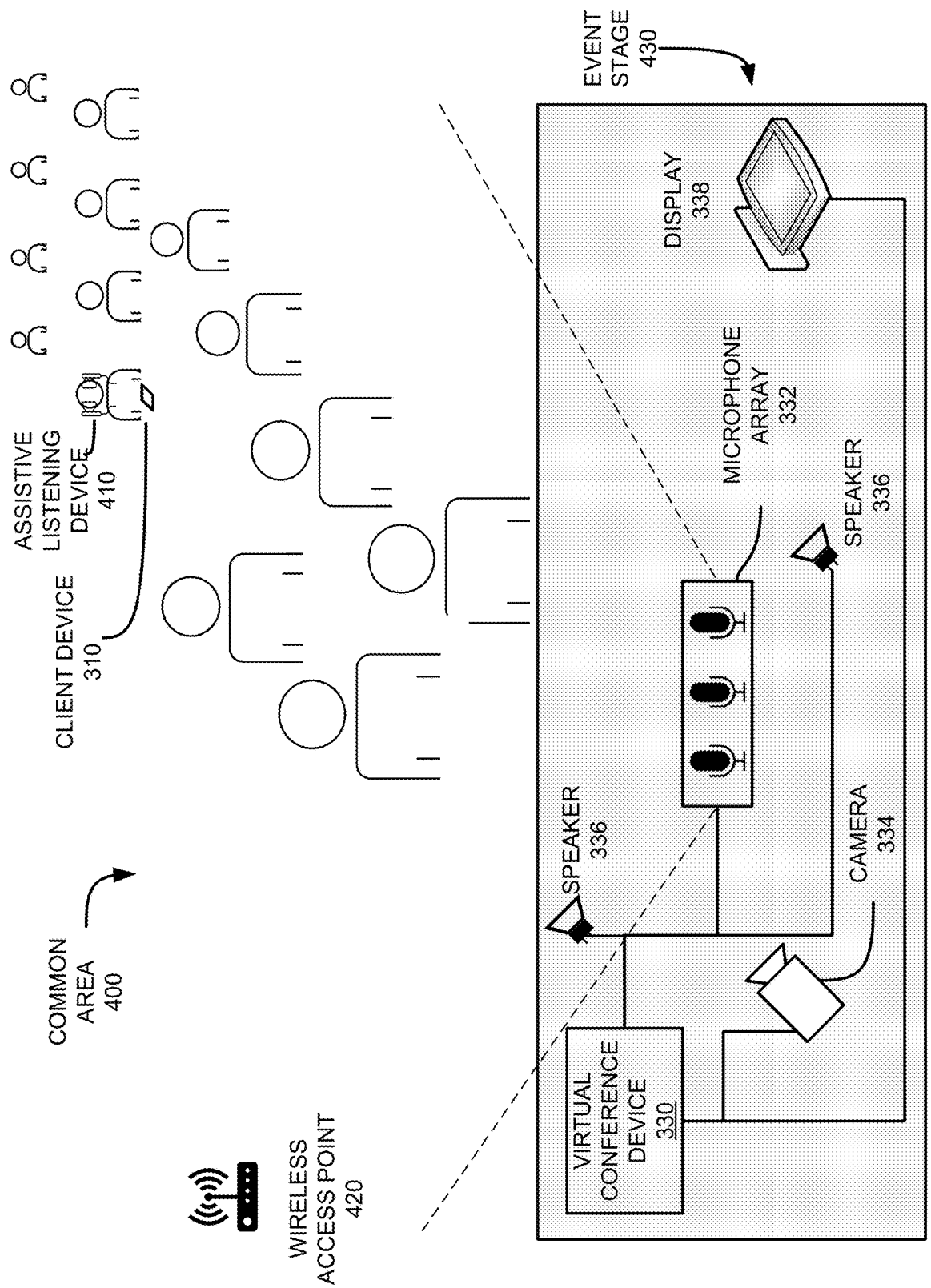
FIG. 4 illustrates an example common area in which multiple people are attending an on-site event.

Referring now to FIG. 4, FIG. 4 shows an example common area 400, such as a conference room or event space, in which multiple people are attending an on-site event. The common area includes an event stage 430 for the on-site event. On the event stage, there may be one or more hosts speaking. A virtual conference device 330 is also installed on the event stage for providing a corresponding virtual session for virtual participation. The virtual conference device 330 connects to the virtual conference provider 340 using the network interface, which may be a wired interface, such as an Ethernet interface, or a wireless interface, such as a WiFi interface.

On-site participants in the conference room can interact with the virtual participants in the virtual session using the camera 334 and microphone array 332 and can see and hear the other participants via the display 338 and speaker devices 336. In addition, on-site participants can also connect to the virtual session via their personal devices, such as client devices 310. For example, an on-site participant in the common area 400 is using client device 310, which may be connected to a wireless network via the available wireless access point 420. As discussed above with respect to FIG. 3, the client device 310 may be any suitable client device, such as a smart phone, tablet computer, or laptop computer. The on-site participant also uses an assistive listening device 410 paired with the client device 310. The assistive listening device 410 can be paired with the client device via Bluetooth, BLE, UWB, or any suitable short-distance wireless communication.

During the virtual conference, the on-site participant joins the virtual session via a virtual conference application installed on client device 310 while in the common area 400. The user of client device 310 elects to activate the assistive listening component in the virtual conference application. The client device 310 can receive audio signals from the audio source at the event stage 430, and also receive audio signals of the virtual session from the virtual conference provider. The audio source can be a speaking host, a voice amplifier of the speaking host, or the speaker device 336 connected to the virtual conference device 330. The virtual conference application installed on the client device can determine if the audio signals directly from audio source have a relative latency in reference to the audio signals of the virtual session at the client device 310 satisfying a threshold value. For example, if the relative latency is greater than the threshold value, which satisfies the threshold value, the virtual conference application delays the audio signals of the virtual session to substantially align in time at the client device 310 with the audio signals directly from the audio source. The client device 310 then transmits the delayed audio signals of the virtual session to the assistive listening device 410. If the relative latency is not greater than the threshold value, which does not satisfy the threshold value, the client device 310 transmits the audio signals of the virtual session from the virtual conference provider to the assistive listening device 410 without delay.

Figure 5:
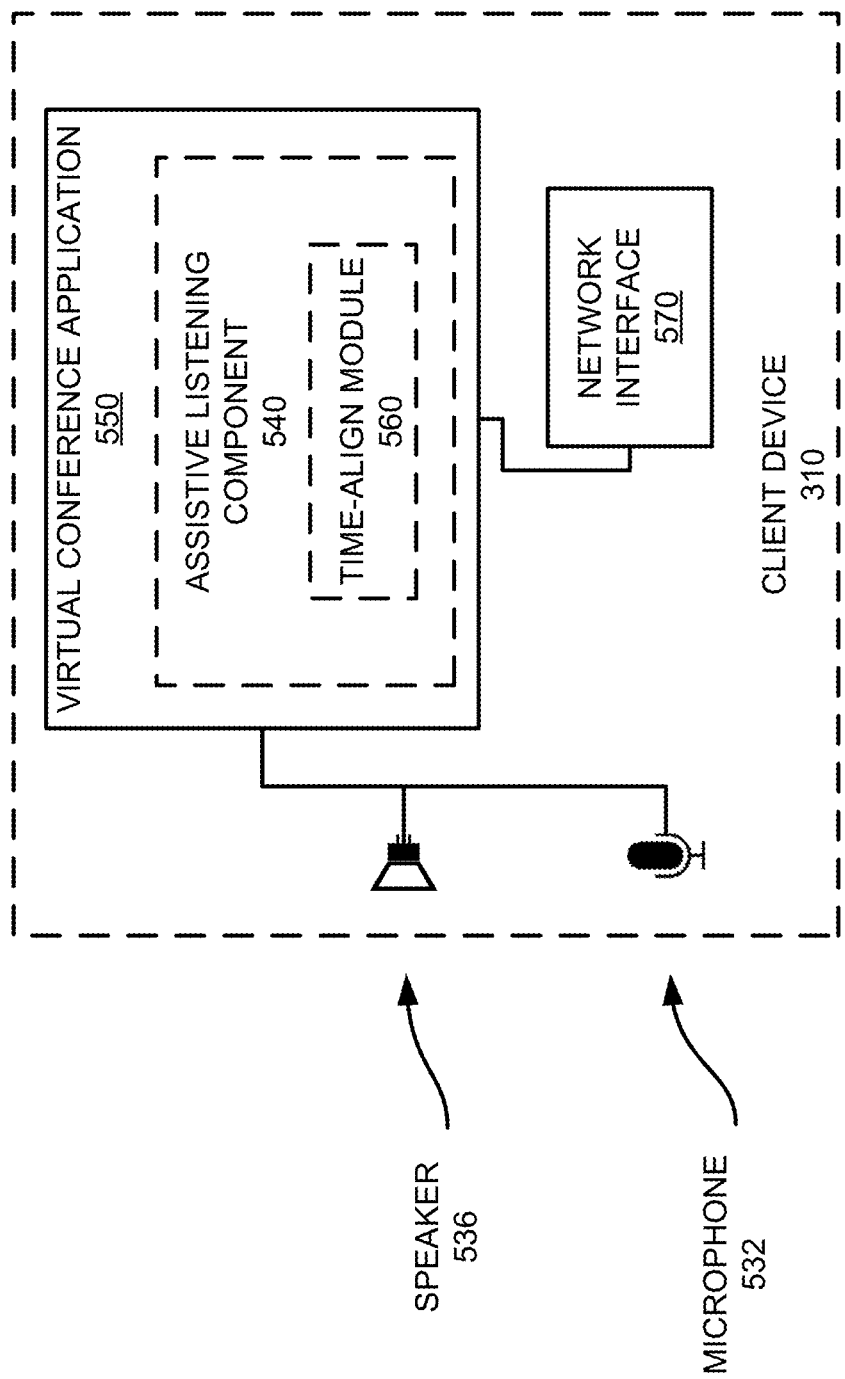
FIG. 5 an example client device that is configured to provide listening assistance.

Referring now to FIG. 5, FIG. 5 shows an example client device 310 that is configured to provide listening assistance. The client device 310 executes a virtual conference application 550 to join a virtual session. The virtual session can be launched by the virtual conference device 330 for a corresponding on-site event. The virtual conference application 550 receives audio signals of the virtual session from the virtual conference provider 340, the audio signals originate from an audio source at the on-site event, such as a speaking host, a voice amplifier of the speaking host, or the speaker device 336 at the event stage.

In this example, the client device includes an internal microphone 532 and speaker 536, though other examples may employ external microphones or speakers. Since the client device joined the virtual session, the microphone 532 of the client device 310 is activated for a participant of the client device to interact with other participants. The client device's microphone 532 can capture audio signals in the common area 400 and transmit to the virtual conference application 550. The audio signals in the common area 400 include audio signals directly from the audio source where the audio signals from the virtual session are originated.

The virtual conference application 550 includes an assistive listening component 540 for providing listening assistance for hearing-impaired on-site participants. The assistive listening component 540 includes time-align module 560. The time-align module 560 is configured to determine if the audio signals directly from the audio source have a relative latency that satisfies a threshold value. The audio signals captured by the client device's microphone 532 include substantially the audio signals from the audio source where the audio signals from the virtual session are originated. However, there may also be noise signals from the common area. The time-align module 560 can extract an audio signature in the audio signals from the common area 400 at a first time point. Similarly, the time-align module 560 can detect the same audio signature in the audio signals from the virtual session at a second time point. In some examples, the time-align module 560 may access frequency information of the two types of audio signals by implementing a Fast Fourier Transformation (FFT) algorithm. The time-align module 560 identifies certain unique peaks, valleys, or other characteristics, which can be considered as a particular pattern together or an audio signature, in the audio signals from the virtual session at a first time point. Similarly, the time-align module 560 identifies the same particular pattern in the audio signals directly from the audio source at the on-site event at the second time point. The time-align module 560 can determine the relative latency by comparing the second time point to the first time point.

While in this example the client device 310 determines the relative latency by extracting audio signatures and comparing the time points of the same audio signature appeared in the two streams of audio signals, the client device 310 can determine the relative latency based on other information, such as location information. For example, the time-align module 560 receives location information of the client device 310. The location information of the client device 310 can be collected by a GPS module in the client device 310 or using Wi-Fi location techniques. Alternatively, or additionally, event locations, such as a conference room, are equipped with micro-location technologies, such as NFC and Bluetooth. For example, a beacon installed at the event stage 430 in a conference room can transmit a beacon signal to the virtual conference application 550 installed on the client device 310 when the client devices are in the conference room. The beacon signal includes the location information of the audio source at the event stage. The time-align module 560 determines a distance between the location of the client device 310 and the location of speaker device 336. Usually, there is a 1-millisecond delay to receive the audio signal for every foot moving away from the audio source. Based on this information, the time-align module 560 then converts the distance to an audio latency value, which is the latency of the audio signals directly from the audio source in the conference room in reference to the audio source.

The virtual conference application 550 can also obtain latency information of the audio streams from the virtual conference provider. The latency of the audio streams of the virtual session from the virtual conference provider varies due to different factors, such as the configuration of the internal transmission network and the virtual conference provider. For example, if the virtual conference provider processes audio streams in a low latency mode, the audio streams may arrive at the personal device with about a 33-millisecond delay in reference to the audio source. The virtual conference application can request relevant information, such as the latency of the audio streams of the virtual session at the client device, from the virtual conference provider. The time-align module 560 then determines the relative latency by comparing the converted audio latency value to the latency of the audio streams of the virtual session at the client device.

In some examples, if the relative latency is greater than a threshold value, which satisfies the threshold value, the time-align module 560 delays the audio signals from the virtual session by the relative latency value, so that the delayed audio signals from the virtual session are aligned in time at the client device 310 with audio signals received from the speaker device 336. In some examples, the threshold value is a value larger than 8 milliseconds. Human brain usually registers the audio signals as two different signals if they arrive with an 8-millisecond time difference. Therefore, if the relative latency is greater than 8 milliseconds, the virtual conference application needs to offset the audio signals from the virtual session so that the user does not register the audio signals directly from the audio source and the audio signals of the virtual session from the virtual conference provider as two different signals. Meanwhile, the alignment does not need to be precise, but substantial. That is, the alignment can have a margin of error no greater than 8 milliseconds.

Even though the time-align module 560 can be implemented in the assistive listening component 540 of the virtual conference application 550 to align the audio streams of the virtual session in time at the client device with the audio signals directly from the audio source at the on-site event, the virtual conference provider or its associated systems can perform the alignment as well. In some instance, the virtual conference provider 340 determines a distance between the client device 310 and the audio source at the event stage 430 based on relevant location information. The virtual conference application 550 installed on client device 310 can transmit the location information of the client device 310 to the virtual conference provider 340. Meanwhile, the virtual conference provider 340 can obtain location information of the audio source, either from the virtual conference device 330 or the virtual conference application 550 installed on the client device 310. Using this location information, the virtual conference provider 340 determines the location between the client device 310 and the audio source at the event stage 430. The virtual conference provider 340 then converts the distance to an audio latency value, which is the latency of the audio signals received by microphone 532 of the client device 310 directly from the audio source. The virtual conference provider can accordingly process the audio signals of the virtual session to be align with the audio signals directly from the audio source at the client device 310.

In other instances, the common area 400 for the on-site event may include specialized hardware to process audio and video streams of the virtual session of the on-site event. Even though, such on-site processing hardware is generally provided to reduce audio and video latency for on-site participants who also join the virtual session, it can also separately process the audio streams for hearing-impaired on-site participants. For example, the on-site processing hardware can include a module to delay the audio stream transmitted to an on-site client device 310 that requested assistive listening, based on the location of the client device.

Figure 6B:
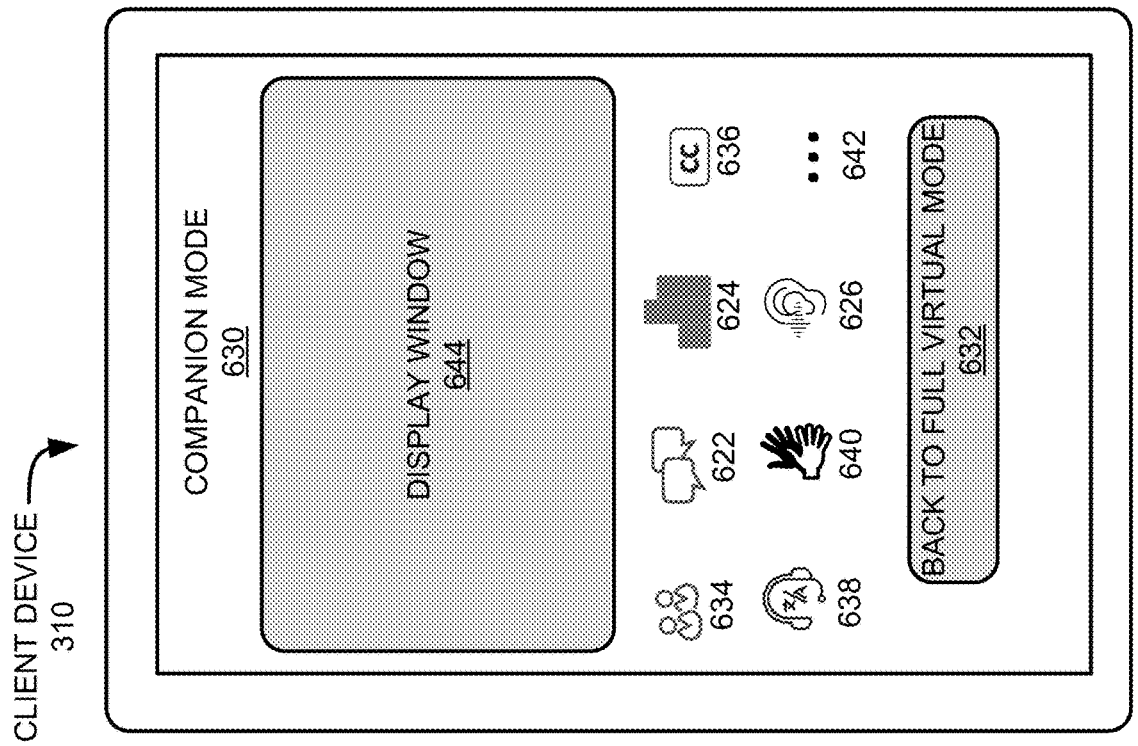
FIG. 6B shows a GUI of a companion mode for the virtual session displayed on the client device after a participant launches the virtual conference application.
Figure 6A:
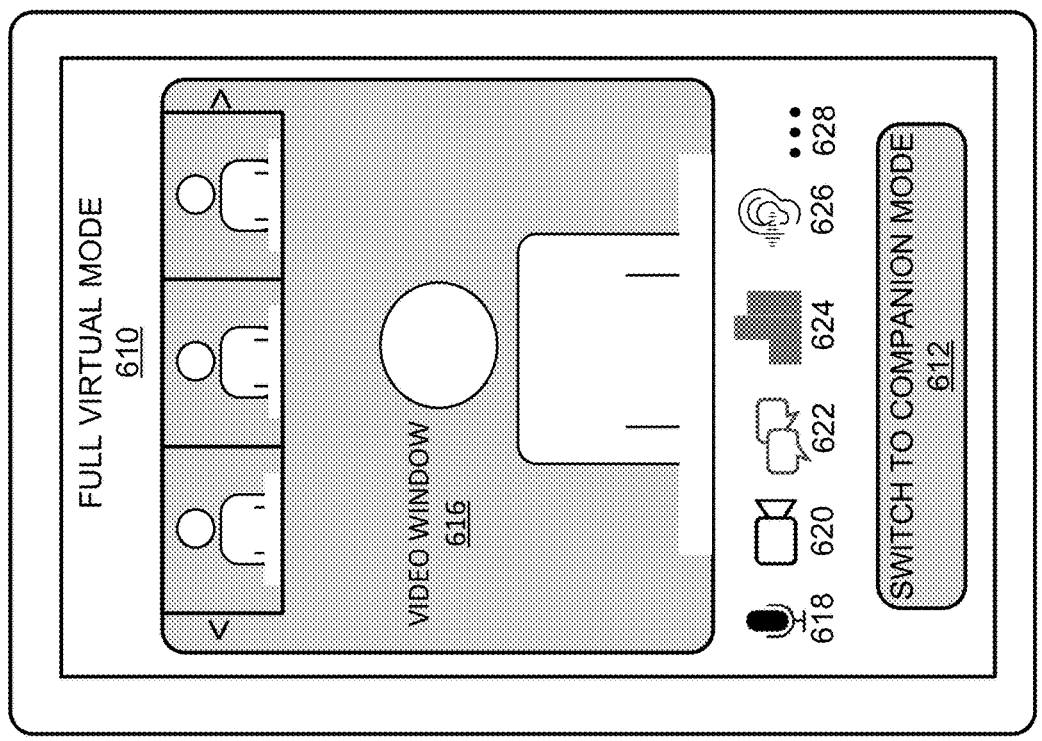
FIG. 6A shows a graphical user interface (GUI) of a full virtual mode for a virtual session displayed on the client device after a participant launches the virtual conference application.

Referring now to FIG. 6A, FIG. 6A shows a graphical user interface (GUI) of a full virtual mode 610 for a virtual session displayed on the client device 310 after a participant launches the virtual conference application 550. The GUI of the full virtual mode 610 is similar to conventional GUIs for virtual conferences. For example, the GUI of the full virtual mode 610 includes a video window 616 to display a camera view of a participant that is current speaking or that is pinned to display all the time. The video window 616 can also display camera views of other participants like the conventional GUIs. Besides, the GUI of the full virtual mode 610 also includes audio input button 618 which can be muted or unmuted; a video input button 620 which can be turned on or off; a chat or Q&A button 622; a poll button 624; and more options 628 like in the conventional GUIs.

However, unlike conventional GUIs which only have one mode, the GUI of the full virtual mode 610 in this disclosure also includes a button 612 for switching to companion mode. Even though the assistive listening component is preferred to be used in companion mode to reduce bandwidth usage and improve audio quality, it works in the full virtual mode as well. When an on-site participant elects to stay in full virtual mode, the on-site participant can still activate the assistive listening button 626. When the assistive listening button 626 is clicked or pressed, the time-align module 560 is activated to align the audio signals of the virtual session and the audio signals received from an audio source at the on-site event via the microphone 532. The aligned audio signals of the virtual session are then transmitted to an assistive listening device 410 that is paired with the client device 310.

Referring now to FIG. 6B, FIG. 6B shows a GUI of a companion mode 630 for the virtual session displayed on the client device 310 after a participant launches the virtual conference application 550. The GUI of the companion mode 630 does not include video streams and audio streams of the virtual session from the virtual conference provider, because on-site participants can usually hear and see what happens at the on-site event directly from the common area 400 or hear and see virtual participants via a speaker device 336 and a display 338. Also, the GUI of the companion mode 630 does not include audio input button 618 or video input button 620 as in the full virtual mode, because the common area of the on-site event usually provides microphones 332 and camera 334 to capture the audio and image of the on-site participants. The companion mode is designed to provide some ancillary features, which are generally available for virtual participants, for on-site participants, such as participant list, chat or Q&A, polls, closed caption. Accordingly, the GUI of the companion mode includes several buttons or icons for activating corresponding features, for example a participant list button 634, a chat or Q&A button 622, a poll button 624, and a closed caption button 636.

Besides, the companion mode also provides some ancillary video or audio, for interpretation, sign language, and assistive listening. For example, when the interpretation button 638 is activated, the virtual conference application can provide audio streams in a selected language. On-site interpreters are not needed this way. Alternatively, or additionally, a participant can provide live transcript in the selected language. Also as an example, when the ASL button 640 is activated, the virtual conference application displays video streams for sign language. Similar to the interpretation service, on-site sign translators are not needed. Yet as another example, as described above, the assistive listening button 626 can activate the assistive listening component 540 in the virtual conference application 550. The virtual conference application then provides audio signals aligned in time with audio signals captured by a microphone on a client device and transmits to an assistive listening device paired to the client device. Other available services can be accessed from the more options button 642.

The display window 644 can display relevant content for activated components. For example, the closed captions can be displayed in the display window 644 when the closed caption button 636 is activated. Also as an example, the ASL video can be displayed in the display window 644 when the ASL button 640 is activated. The display window 644 can be an embedded window, or a floating window.

Figure 7:
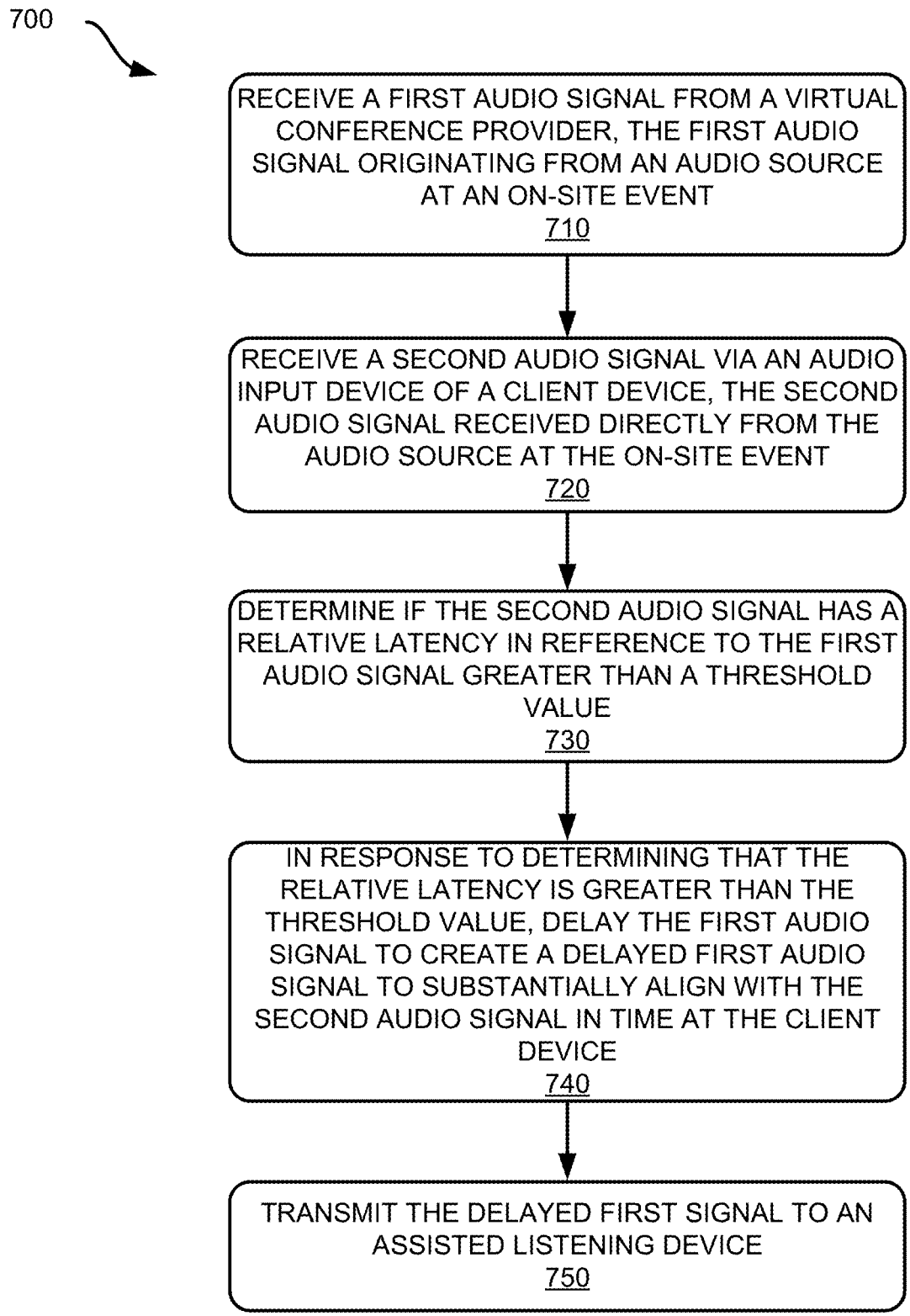
FIG. 7 shows an example method for providing listening assistance via a virtual conference application.

Referring now to FIG. 7, FIG. 7 shows an example method 700 for providing listening assistance via a virtual conference application 550. The example method 700 will be discussed with respect to the system 300 shown in FIG. 3, the common area 400 of an on-site event shown in FIG. 4, the client device 310 shown in FIG. 5, the system; however, any suitable system for providing listening assistance via a virtual conference application for hybrid events may be used.

At block 710, a client device 310 receives a first audio signal from a virtual conference provider. The client device 310 is installed with a virtual conference application 550 provided by a virtual conference provider 340. An on-site participant launches the virtual conference application 550 to join a virtual session corresponding to an on-site event that the on-site participant is attending. The virtual conference application 550 receives the first audio signal of the virtual session from the virtual conference provider 340, generally as described above with respect to FIGS. 1-4. The first audio signal originates from an audio source at an on-site event. The audio source can be a speaker host or a voice amplifier of the speaking host at the on-site event. A virtual conference device 330 that is hosting a virtual session for the on-site event can capture audio waves from the audio source and convert to audio signals to transmit to the virtual conference provider 340, which are then distributed to the participants in the virtual session, generally as described above with respect to FIGS. 1-2.

At block 720, the client device 310 receives a second audio signal via an audio input device of the client device, the second audio signal received directly from the audio source at the on-site event. Once the participant joins the virtual session via the virtual conference application 550 installed on the client device 310, the microphone 532 on the client device can be activated to allow the participant to interact with the virtual session. The microphone 532 can capture audio signals from the audio source at the on-site event. The virtual conference application 550 receives the second audio signal from the audio source at the on-site event via the microphone 532 of the client device.

At block 730, the client device 310 determines if the second audio signal has a relative latency in reference to the first audio signal satisfies a threshold value, generally as described above with respect to FIG. 5. For example, when the assistive listening component 540 of the virtual conference application 550 is activated by the on-site participant, the time-align module 560 of the assistive listening component 540 extracts a particular audio signature from the first audio signal at a first time point and analyzes the second audio signal to detect the same particular audio signal at the second time point. The time-align module 560 determines the relative latency at the client device based on the first time point and the second time point. The time-align module 560 then compares the relative latency to a threshold value to determine if the relative latency satisfies the threshold value. In some examples, the time-align module 560 can determine a distance between the client device 310 and the audio source at the event stage 430 and convert the distance to an audio latency for the second audio signal in reference to the audio source. Meanwhile, the time-align module 560 can obtain the latency of the first audio signal in reference to the audio source from the virtual conference provider. Thus, the relative latency can also be obtained using the audio latency for the second audio signal in reference to the audio source and the latency of the first audio signal in reference to the audio source.

At block 740, in response to determining that the relative latency satisfies the threshold value, the client device 310 delays the first audio signal to create a delayed first audio signal to substantially align in time at the client device 310 with the second audio signal. This step is to provide time-aligned audio signals at the ears of a hearing-impaired participant. There can be a transmission delay in transmitting the delayed first audio signal from the client device to a paired assistive device. The transmission delay can be very small, but it may be measurable. Thus, the transmission delay is accounted for in the relative latency when compared to the threshold value. In some examples, if the relative latency is greater than the threshold value, it satisfies the threshold value. If the relative latency is greater than the threshold value, the time-align module 560 delays the first audio signal to be substantially aligned with the second audio signal in time at the client device. In some examples, the time-align module 560 uses a delay buffer in the first audio signal to create a delayed audio signal. If the relative latency is not greater than the threshold value, it does not satisfy the threshold value, and the time-align module does not delay the first audio signal.

Alternatively, or additionally, the virtual conference provider 340 can adjust the first audio signal to be substantially aligned in time with the second audio signal at the client device 310. The virtual conference application 550 can transmit the location of the client device or the distance between the client device and the audio source at the event stage to the virtual conference provider 340. The virtual conference provider then determines a latency of the second audio signal at the client device in reference to the audio source based on the location or distance information. Accordingly, the virtual conference provider 340 adjusts the audio signals of the virtual session so that the first audio signal of the virtual session at the client device is substantially aligned in time with the second audio signal received by the client device.

Figure 8:
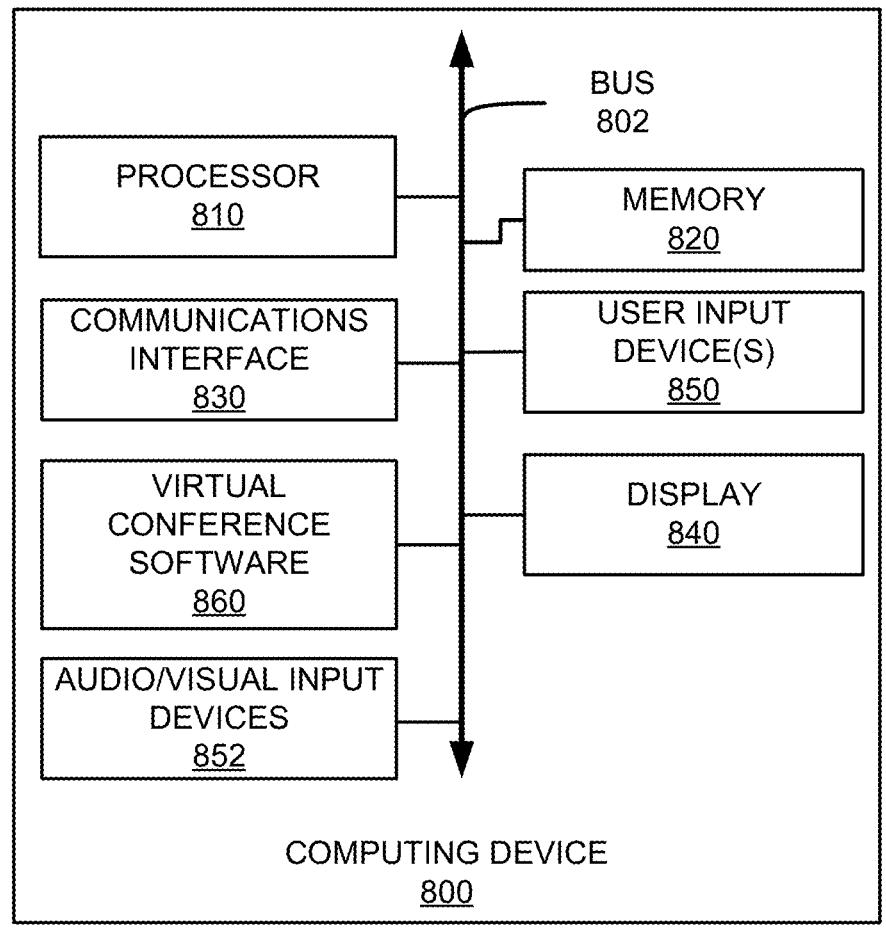
FIG. 8 shows an example computing device suitable for use with example systems and methods for providing listening assistance via a virtual conference application.

At block 750, the client device 310 transmits the delayed first audio signal to an assistive listening device 410. In some examples, the assistive listening device 410 is paired with the client device 310 via Bluetooth, Bluetooth Low Energy, ultra-wideband, or any suitable short-distance communication protocol. In some examples, the assistive listening device 410 is physically connected to the client device 310. The delayed first audio signal is transmitted to the assistive listening device via the short-distance communication protocol or wired connection. Since the delayed first audio signal is substantially aligned with the second audio signal received by the client device 310, the delayed first audio signal is timely aligned with the audio waves travelled to on-site participant's ears from the audio source at the event stage. Thus, it would not cause confusion for the on-site participant when the delayed first audio signal is transmitted to the assistive listening device 410 worn by the on-site participant. The delayed first audio signal can be transmitted to Referring now to FIG. 8, FIG. 8 shows an example computing device 800 suitable for use in example systems or methods for providing listening assistance via a virtual conference application according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for providing listening assistance via a virtual conference application according to different examples, such as part or all of the example method 700 described above with respect to FIG. 7. In some embodiments, the computing device may include software 860 for executing one or more methods described herein, such as for example, one or more steps of method 700. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes a virtual conference software 860 to enable a user to join and participate in one or more virtual spaces or in one or more conferences, such as a conventional conference or webinar, by receiving multimedia streams from a virtual conference provider, sending multimedia streams to the virtual conference provider, interacting with other participants via chats, interacting with hosts via polls, receiving simultaneous interpretation, watching ASL translation, receiving assistive listening, etc., such as described throughout this disclosure, etc.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assistive, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving, by a client device, a first audio signal of a virtual session from a virtual conference provider, wherein the first audio signal originates from an audio source at an on-site event corresponding to the virtual session;
receiving, by the client device, a second audio signal via an audio input device of the client device, the second audio signal received directly from the audio source at the on-site event;
determining, by the client device, whether a latency of the second audio signal in reference to the first audio signal satisfies a threshold value;
in response to determining that the latency satisfies the threshold value, delaying the first audio signal to create a delayed first audio signal to substantially align with the second audio signal in time at the client device; and
transmitting the delayed first audio signal to an assistive listening device.

2. The method of claim 1, wherein determining whether the latency of the second audio signal in reference to the first audio signal satisfies the threshold value comprises:
detecting a particular audio signature from the first audio signal at a first time point;
detecting the particular audio signature in the second audio signal at a second time point;
determining the latency by comparing the second time point to the first time point; and
comparing the latency to the threshold value.

3. The method of claim 1, wherein the virtual conference provider is configured to generate the first audio signal in a low latency mode, wherein the first audio signal has a first latency in the low latency mode in reference to the audio source, wherein determining whether the latency of the second audio signal in reference to the first audio signal satisfies the threshold value comprises:
determining a distance between a location of the client device and a location of the audio source;
converting the distance into a second latency for the second audio signal in reference to the audio source;
determining the latency of the second audio signal in reference to the first audio signal based on the second latency of the second audio signal in reference to the audio source and the first latency of the first audio signal in reference to the audio source; and comparing the latency of the second audio signal in reference to the first audio signal to the threshold value.

4. The method of claim 1, further comprising:

in response to determining that the latency of the second audio signal in reference to the first audio signal does not satisfy the threshold value, transmitting the first audio signal to the assistive listening device.

5. The method of claim 1, further comprising delaying the first audio signal by using a delay buffer on the first audio signal.

6. The method of claim 1, further comprising transmitting the delayed first audio signal to the assistive listening device via Bluetooth, wherein the assistive listening device is paired with the client device via Bluetooth.

7. The method of claim 1, further comprising transmitting the delayed first audio signal to the assistive listening device via Bluetooth Low Energy (BLE), wherein the assistive listening device is paired with the client device via BLE.

8. The method of claim 1, further comprising transmitting the delayed first audio signal to the assistive listening device via ultra-wideband (UWB), wherein the assistive listening device is paired with the client device via UWB.

9. The method of claim 1, wherein the assistive listening device is connected to the client device by a wire.

10. The method of claim 1, further comprising adjusting, by the client device, a strength level of the delayed first audio signal.

11. The method of claim 1, further comprising transmitting location information about the client device to the virtual conference provider, wherein the virtual conference provider is configured to:

determine whether the latency of the second audio signal in reference to the first audio signal satisfies the threshold value based on the location information, delay the first audio signal to create a delayed first audio signal to substantially align with the second audio signal in time at the client device, and transmit the delayed first audio signal to the client device.

12. A system comprising:

a communications interface;

a non-transitory computer-readable medium; and one or more processors communicatively coupled to the communications interface and the non-transitory computer-readable medium, the one or more processors configured to execute processor-executable instructions stored in the non-transitory computer-readable medium to:

receive a first audio signal of a virtual session from a virtual conference provider, wherein the first audio signal originates from an audio source at an on-site event corresponding to the virtual session;

receive a second audio signal via an audio input device of a client device, the second audio signal received directly from the audio source at the on-site event;

determine whether a latency of the second audio signal in reference to the first audio signal satisfies a threshold value;

in response to determining that the latency of the second audio signal in reference to the first audio signal satisfies the threshold value, delay the first audio signal to create a delayed first audio signal to substantially align with the second audio signal in time at the client device; and transmit the delayed first audio signal to an assistive listening device.

13. The system of claim 12, wherein the one or more processors are configured to execute further processor-executable instructions stored in the non-transitory computer-readable medium to:

detect a particular audio signature from the first audio signal at a first time point;

detect the particular audio signature in the second audio signal at a second time point;

determine the latency by comparing the second time point to the first time point; and compare the latency to the threshold value.

14. The system of claim 12, wherein the virtual conference provider is configured to generate the first audio signal in a low latency mode, wherein the first audio signal has a first latency in the low latency mode in reference to the audio source, wherein determining whether the latency of the second audio signal in reference to the first audio signal satisfies the threshold value comprises:

determining a distance between a location of the client device and a location of the audio source;

converting the distance into a second latency for the second audio signal in reference to the audio source;

determining the latency of the second audio signal in reference to the first audio signal based on the second latency of the second audio signal in reference to the audio source and the first latency of the first audio signal in reference to the audio source; and comparing the latency of the second audio signal in reference to the first audio signal to the threshold value.

15. The system of claim 12, wherein the one or more processors are configured to execute further processor-executable instructions stored in the non-transitory computer-readable medium to:

in response to determining that the latency of the second audio signal in reference to the first audio signal does not satisfy the threshold value, transmit the first audio signal to the assistive listening device.

16. The system of claim 12, wherein the one or more processors are configured to execute further processor-executable instructions stored in the non-transitory computer-readable medium to:

use a delay buffer on the first audio signal to create the delayed first audio signal to substantially align with the second audio signal in time at the client device.

17. A non-transitory computer-readable medium comprising code that is executable by a processor for causing the processor to:

receive a first audio signal of a virtual session from a virtual conference provider, wherein the first audio signal originates from an audio source at an on-site event corresponding to the virtual session;

receive a second audio signal via an audio input device of a client device, the second audio signal received directly from the audio source at the on-site event;

determine whether a latency of the second audio signal in reference to the first audio signal satisfy a threshold value;

in response to determining that the latency of the second audio signal in reference to the first audio signal satisfies the threshold value, delay the first audio signal to create a delayed first audio signal to substantially align with the second audio signal in time at the client device; and transmit the delayed first audio signal to an assistive listening device.

18. The non-transitory computer-readable medium of claim 17, further comprising processor-executable instructions configured to cause one or more processors to:
- detect a particular audio signature from the first audio signal at a first time point;
- detect the particular audio signature in the second audio signal at a second time point;
- determine the latency by comparing the second time point to the first time point; and
- compare the latency to the threshold value.

19. The non-transitory computer-readable medium of claim 17, further comprising processor-executable instructions configured to cause one or more processors to:
- transmit the delayed first audio signal to the assistive listening device via wireless communication comprising Bluetooth, Bluetooth Low Energy, or ultra-wideband, wherein the assistive listening device is paired with the client device via the wireless communication.

20. The non-transitory computer-readable medium of claim 17, further comprising processor-executable instructions configured to cause one or more processors to:
- adjust a strength level of the delayed first audio signal.

\* \* \* \* \*